Figure 1:
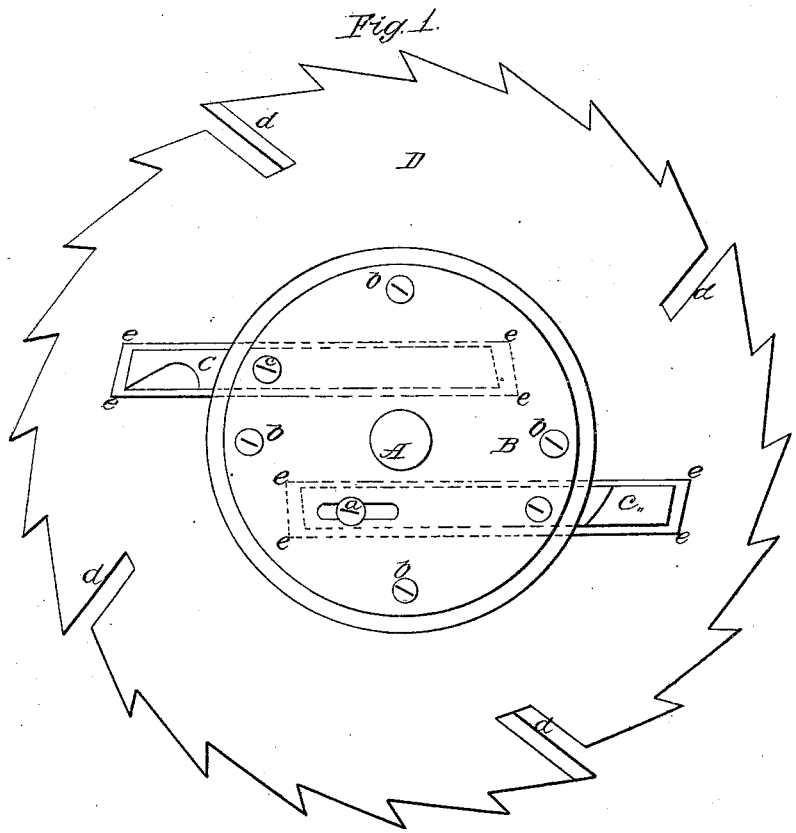

J. Humphrey,
Making Clothes Pins.

N° 22,430. Patented Dec. 28, 1858.

Witnesses
Geo. W. Sturtevant
J. H. Flint

Inventor
John Humphrey

UNITED STATES PATENT OFFICE.

JOHN HUMPHREY, OF KEENE, NEW HAMPSHIRE.

TOOL FOR SLOTTING CLOTHES-PINS.

Specification of Letters Patent No. 22,430, dated December 28, 1858.

*To all whom it may concern:*

Be it known that I, JOHN HUMPHREY, of Keene, in the county of Cheshire and State of New Hampshire, have invented a new and useful Improvement in Machines for Cutting Slots in Clothes-Pins; and I do hereby declare that the following is a full, clear, and exact description thereof, reference being had to the accompanying drawings, making a part of this specification.

In order to show more clearly the nature and object of my invention, I will allude briefly to the devices heretofore employed for the same purpose of mine, naming their defects which it is desirable to overcome.

The usual mode of slotting clothes-pins has been to cut narrow or straight slots or kerfs in them, with a circular saw having cutters near its periphery, for smoothing the sides of the slot. The outer ends of these slots were then widened or flared (or as it is usually termed "tipped") by means of cutters attached to a reciprocating slide or gate, arranged to cut obliquely on each side of the slot made by the saw. Cutters have also been similarly arranged upon a revolving arbor and used for the same purpose. This required two operations, "sawing" and "tipping." A circular saw having cutters formed on its sides, for flaring its slot has also been used, as may be seen in O. P. Allen's patent granted May 14, 1850. These cutters were usually formed of portions of the plate of the saw bent outward, and were subject to several imperfections which were an obstacle to their use. They were difficult to make, oftentimes they were broken by bending them to a proper form, thus spoiling the saw. In other instances they would not retain the position in which they were "set" but would spring out of place, requiring much labor and care to keep them in order, and they were not easy to adjust. They were difficult to sharpen, as they could not be removed to be ground, and as the plate of a saw is not suitably tempered for such cutters, it was necessary to sharpen them very often, consequently they were soon worn away, and the saw rendered useless. The saws were also weakened by having the plate cut away so much where it received no support from the collars of the arbor that it was unsafe to run them at a sufficient speed, lest they should fly in pieces (as they have done in some instances) endangering the life of the user. It is also difficult and expensive to attach cutters made in separate pieces, to the sides of a saw, so as to have them work well and be safe to use, and such have no means of adjustment, for making slots of different lengths and sizes, or to compensate for the wearing away of themselves or the saw, and they soon become worn out of shape, or too small, so that a comparatively small amount of work is performed by them before they must be replaced by new ones. To obviate these defects has long been a desideratum, and to produce a device for the simultaneous "sawing" and "tipping" so as to form a perfect slot at a single operation, having cutters that may be easily detached to be sharpened, readily reset, acurately adjusted to, and securely held in, any required position, and at the same time be more durable, and less expensive than others heretofore used is the object of my invention, which consists in a method of arranging "tipping" knives or cutters, to act simultaneously with a saw which cuts the narrow or straight slots, by having them secured to disks or flanches on its arbor or shaft,—portions of the plate of the saw being removed, or cut away, to make place for the cutters, so that they may be held independently of it, by the flanches, and be free to be removed, adjusted, &c., as will more fully appear in the following description of the mode of constructing and using the same.

Figure 2:
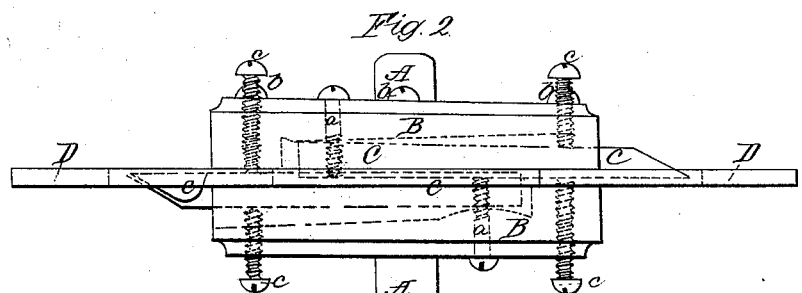
Figure 3:
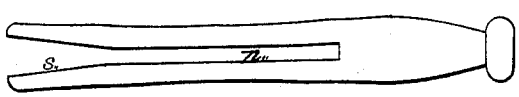

Figure 1, of the drawings, is an end view of the device. Fig. 2, is a view at the side, or parallel with its axis of motion. Fig. 3, represents a clothes-pin, and shows the form of the slot.

A, represents the arbor or shaft of the saw, it may be made in any proper manner, and be furnished with suitable journals for its support, and a band-wheel for giving it motion. B, and B, are two flanges or disks one of which is made fast to the shaft, and the other secured to it, by screw-bolts $b, b, b, b$. In them are recesses for the "tipping" knives or cutters C, C, which cut the flaring part of the slot, (as seen at $s$, Fig. 3,) their shape corresponding thereto. They are secured to the flanges by screws $a$, and $c, c$, the inner end of each having a thread in it, for screw, $a$, which passes through a mortise $m$, in the flanch, which allows the cutter to be adjusted in the direction of its length, to suit the length of the slots required, and to compensate for the decreasing diameter of the saw as it becomes worn. The outer ends of the cutters are firmly held between the screws c, c, by which they may be moved in a lateral direction, sufficiently to widen or flare the slots any amount desired. By withdrawing screw a, and loosening one of the screws c, the cutter can be taken out to be sharpened or repaired, and can be easily reset.

D, is a circular saw of sufficient thickness to cut the narrow or straight portion of the slot,—pieces of its plate d, d, d, d, near its periphery, are filed and set so as to form cutters for smoothing the sides of the slots. It is confined between and carried by the flanges B, B. Portions of its plate, as represented by lines e, e,) are removed, or cut away, so as not to interfere with the cutters C, C.

To use this device, it is arranged with other suitable mechanism for holding the pins, and presenting them to it, when it will cut a perfect slot at a single operation, as quickly as the narrow part alone could be cut in the usual manner. It may be used in connection with the improved machine for which Letters-Patent (No. 16,923) were granted to me March 31, 1857, or with other mechanism which it is not necessary to describe here, as several kinds are known to which it may be applied.

By cutting a perfect slot at one operation, more than one-half the expense of the work is saved, the utility of a device which will accomplish it, is therefore obvious, also the advantages of one constructed, so that the cutters may be removed, reset and adjusted for the purposes stated, and by having portions of the plate cut from the saw, so as to insert cutters which are held independent of it, by the flanges, in the manner which I have described, these useful results are attained.

The cutters can be quickly and accurately set, to any required position, and be securely kept therein, or be easily removed when necessary.

This saw and cutters can be made in a superior manner, and at less expense than one having cutters formed of or attached to its plate, it is also more durable inasmuch as the cutters are capable of adjustment to compensate for the wear, so that more than twice the amount of work can be performed by it, than by one having fixed cutters.

Although considerable portions of the plate of this saw, are cut away, yet it is so well supported by the flanges, which are necessarily large and strong, in order to hold the cutters, that it is quite as strong as a whole saw would be with collars of the usual size.

I do not claim by themselves, a saw having the cutters d, d, d, d, near its periphery for smoothing the sides of its slot, nor the cutters for "tipping" or flaring the outer ends of the slots, when separately used. And I disclaim, the use of cutters formed of, or attached to, the sides of a circular saw, as described in Letters-Patent granted O. P. Allen, May 14, 1850.

I am also aware that it is not new to attach cutters to the shafts of circular saws, so that both may operate simultaneously, and I do not broadly claim such an arrangement, but

I claim—

Arranging knives or cutters, to widen or flare the outer ends of the slots in clothespins, simultaneously with the sawing thereof, by having portions of the plate of the saw removed, and the cutters secured to the disks or flanges on the arbor, and held thereby independent of the saw, as herein shown and described, by which arrangement, a perfect and complete slot may be cut at a single operation, and the cutters may be quickly and accurately adjusted to any required position, and be securely kept therein, or be readily removed when desired, as set forth.

JOHN HUMPHREY.

Witnesses:
GEO. W. STURTEVANT,
T. H. FLINT.